United States Patent
Ishihara et al.

(10) Patent No.: US 10,332,273 B2
(45) Date of Patent: Jun. 25, 2019

(54) BUILDING 3D MAP

(71) Applicant: INTERNATIONAL BUSINESS MACHINES CORPORATION, Armonk, NY (US)

(72) Inventors: Tatsuya Ishihara, Tokyo (JP); Jayakorn Vongkulbhisal, Bangkok (TH)

(73) Assignee: International Business Machines Corporation, Armonk, NY (US)

(*) Notice: Subject to any disclaimer, the term of this patent is extended or adjusted under 35 U.S.C. 154(b) by 98 days.

(21) Appl. No.: 15/379,377

(22) Filed: Dec. 14, 2016

(65) Prior Publication Data

US 2017/0169583 A1    Jun. 15, 2017

(30) Foreign Application Priority Data

Dec. 14, 2015 (JP) .................. 2015-243591

(51) Int. Cl.
*G06T 7/73* (2017.01)
*G06T 7/579* (2017.01)

(52) U.S. Cl.
CPC .............. *G06T 7/73* (2017.01); *G06T 7/579* (2017.01); *G06T 2207/10016* (2013.01); *G06T 2207/10021* (2013.01)

(58) Field of Classification Search
CPC . G06T 2207/10016; G06T 2207/10021; G06T 7/579; G06T 7/73; G06K 2209/40; G06Q 20/40145
USPC ........................................................ 382/154
See application file for complete search history.

(56) References Cited

U.S. PATENT DOCUMENTS

| | | | |
|---|---|---|---|
| 8,798,357 B2 | 8/2014 | Sinha et al. | |
| 2012/0300020 A1* | 11/2012 | Arth | ........................ G06T 7/75 |
| | | | 348/36 |
| 2015/0262420 A1 | 9/2015 | Arun | |
| 2016/0290805 A1* | 10/2016 | Irish | ..................... G01C 21/005 |
| 2018/0012364 A1* | 1/2018 | Mullins | ................. G06T 19/006 |

FOREIGN PATENT DOCUMENTS

| | | |
|---|---|---|
| WO | 2015126499 A2 | 8/2015 |
| WO | 2015126951 A1 | 8/2015 |

OTHER PUBLICATIONS

M. Pollyefeys, Detailed Real-Time Urban 3D Reconstruction From Video, International Journal of Computer Vision, Jul. 2008, vol. 78—Iss. 2, pp. 143-167, Springer Science+Business Media, LLC 2007, Published Online <https://pdfs.semanticscholar.org/5506/2ce658f7828876c058c5e96c5071525a1b5e.pdf/>.

(Continued)

*Primary Examiner* — Daniel G Mariam
(74) *Attorney, Agent, or Firm* — Stephen R. Yoder (57) ABSTRACT

A computer-implemented method for building a 3D map, includes: obtaining plural videos and plural video-related data units, each of the plural video-related data units indicating a feature of radio wave signals received at a place where a corresponding video has been taken; reconstructing plural 3D models, respectively, based on the plural videos; selecting a pair of 3D models from the plural 3D models based on similarity between a corresponding pair of video-related data units; and merging the pair of 3D models to obtain the 3D map.

15 Claims, 7 Drawing Sheets

(56) References Cited

OTHER PUBLICATIONS

Hao Du, Interactive 3D Modeling of Indoor Environments with a Consumer Depth Camera, UbiComp '11 Proceedings of the 13th international conference on Ubiquitous computing, Sep. 2011, pp. 75-84, ACM 2011, New York, NY <http://dl.acm.org/citation.cfm?id=2030123/>.

Jingguo Li, Visual 3D Modeling from Images and Videos, Intel Labs China, Jun. 3, 2010.

Kroeger et al. "Video Registration to SfM Models". Fleet et al. (Eds.): ECCV 2014, Part V, LNCS 8693, pp. 1-16, 2014. Springer International Publishing Switzerland 2014. <http://www.vision.ee.ethz.chipublications/papers/proceedings/eth_biwi_01139.pdf>.

Ruiz-Ruiz et al. "A multisensor LBS using SIFT-based 3D models". 2012 International Conference on Indoor Positioning and Indoor Navigation, Nov. 13-15, 2012. Ten pages.

SCHOUWENAARS et al. "Robust Scene Stitching in Large Scale Mobile Mapping" BMVC 2013. Eleven pages <http://www.vision.ee.ethz.ch/publications/papers/proceedings/eth_biwi_01049.pdf>.

\* cited by examiner

BUILDING 3D MAP

CROSS-REFERENCE TO RELATED APPLICATIONS

This application claims priority under 35 U.S.C. § 119 from Japanese Patent Application No. 2015-243591 filed Dec. 14, 2015, the entire contents of which are incorporated herein by reference.

BACKGROUND

The present invention relates to building a 3D map.

Recently, various techniques have been known regarding building a 3D map.

SUMMARY OF THE INVENTION

According to an embodiment of the present invention, there is provided a computer-implemented method for building a 3D map. The method includes obtaining plural videos and plural video-related data units. Each of the plural video-related data units indicates a feature of radio wave signals received at a place where a corresponding video has been taken. The method further includes reconstructing plural 3D models, respectively, based on the plural videos. The method further includes selecting a pair of 3D models from the plural 3D models based on similarity between a corresponding pair of video-related data units. The method furthermore includes merging the pair of 3D models to obtain the 3D map.

According to another embodiment of the present invention, there is provided an apparatus for building a 3D map. The apparatus includes a processor and a memory coupled to the processor. The memory includes program instructions. The program instructions are executable by the processor to obtain plural videos and plural video-related data units. Each of the plural video-related data units indicates a feature of radio wave signals received at a place where a corresponding video has been taken. The program instructions are executable by the processor to further reconstruct plural 3D models, respectively, based on the plural videos. The program instructions are executable by the processor to further select a pair of 3D models from the plural 3D models based on similarity between a corresponding pair of video-related data units. The program instructions are executable by the processor to furthermore merge the pair of 3D models to obtain the 3D map.

According to yet another embodiment of the present invention, there is provided a computer program product for building a 3D map. The computer program product includes a computer readable storage medium having program instructions embodied with the computer readable storage medium. The program instructions are executable by a computer to obtain plural videos and plural video-related data units. Each of the plural video-related data units indicates a feature of radio wave signals received at a place where a corresponding video has been taken. The program instructions are executable by a computer to further reconstruct plural 3D models, respectively, based on the plural videos. The program instructions are executable by a computer to further select a pair of 3D models from the plural 3D models based on similarity between a corresponding pair of video-related data units. The program instructions are executable by a computer to furthermore merge the pair of 3D models to obtain the 3D map.

DETAILED DESCRIPTION OF THE PREFERRED EMBODIMENTS

Hereinafter, exemplary embodiments of the present invention will be described in detail with reference to the attached drawings.

It is to be noted that the present invention is not limited to these exemplary embodiments to be given below and can be implemented with various modifications within the scope of the present invention. In addition, the drawings used herein are for purposes of illustration, and can not show actual dimensions.

Figure 1:
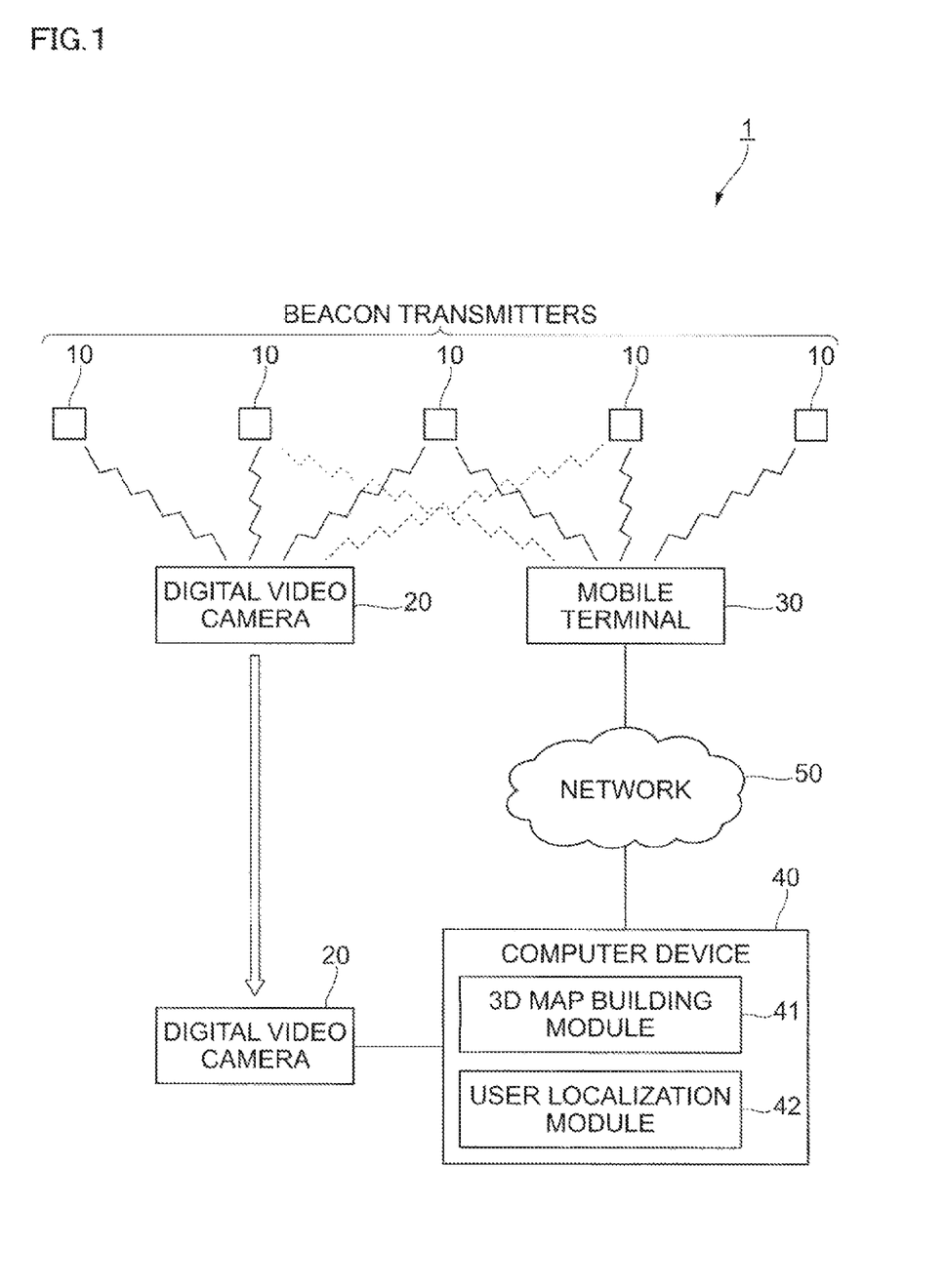
FIG. 1 depicts a block diagram of a computer system according to exemplary embodiments of the present invention.

Referring to FIG. 1, there is shown a block diagram of a computer system 1 to which the exemplary embodiments are applied. The computer system 1 can be used to build a three-dimensional (3D) map of a large-scale environment, and to localize a user in the large-scale environment by using the 3D map. The large-scale environment can be an indoor environment having similar appearances. The large-scale environment can be, for example, an office building, a shopping mall, a hospital, or the like. The result of localization can be used for a blind navigation system, an autonomous wheel chair, an autonomous robot, or the like.

As shown in the figure, the computer system 1 can include beacon transmitters 10 installed in the large-scale environment. The computer system 1 can further include a digital video camera 20, a mobile terminal 30, and a computer device 40 connected to the mobile terminal 30 via a network 50 such as a wireless network.

Each of the beacon transmitters 10 can transmit a beacon signal able to identify itself. The number of the beacon transmitters 10 is not limited to five, and the beacon transmitters 10 more than or less than five can be installed in the large-scale environment. The beacon signal is one example of a radio wave signal. A Wi-Fi signal can be used as the radio wave signal instead of the beacon signal.

The digital video camera 20 can take videos of the large-scale environment in response to an operation by a creator of the 3D map of the large-scale environment. Then, the digital video camera 20 can make files each including a feature of beacon signals received from the beacon transmitters 10. Such files are hereinafter referred to as "beacon signal files". Further, the digital video camera 20 can be carried near the computer device 40, as indicated by the white arrow in the figure, by the creator of the 3D map, and can provide the computer device 40 with the videos and the beacon signal files, for example via a Universal Serial Bus (USB), in response to an operation by the creator of the 3D map.

The mobile terminal 30 can take a picture of the large-scale environment in response to an operation by a user who intends to know where he or she is located. Then, the mobile terminal 30 can obtain a beacon signal information piece indicating a feature of beacon signals received from the beacon transmitters 10. Further, the mobile terminal 30 can send the picture and the beacon signal information piece to the computer device 40 via the network 50.

The computer device 40 can build the 3D map based on the videos and the beacon signal files provided by the digital video camera 20, and localize the user based on the picture and the beacon signals information piece received from the mobile terminal 30, and the 3D map. Specifically, the computer device 40 can include a 3D map building module 41 that performs processing of building a 3D map, and a user localization module 42 that performs processing of localizing a user.

Figure 2:
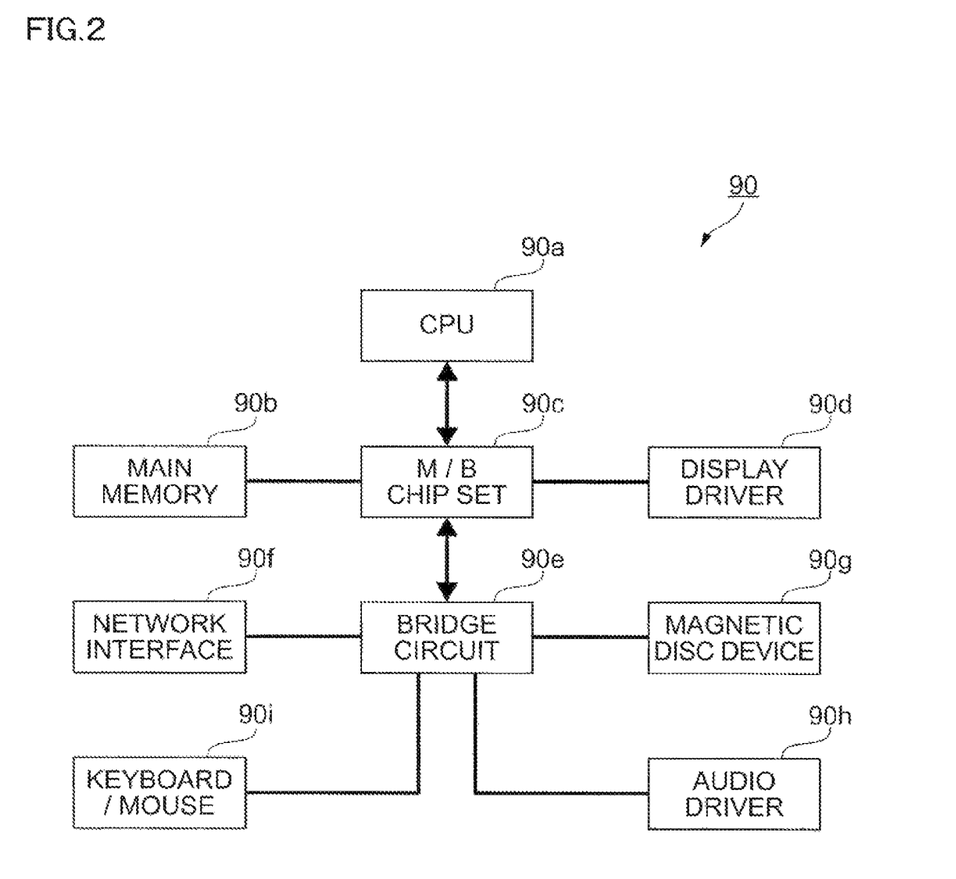
FIG. 2 depicts an example of a hardware configuration of a computer able to implement exemplary embodiments of the present invention.

Referring to FIG. 2, there is shown an example of a hardware configuration of a computer 90 able to be used as the computer device 40. As shown in the figure, the computer 90 can include a central processing unit (CPU) 90a serving as one example of a processor, a main memory 90b connected to the CPU 90a via a motherboard (M/B) chip set 90c and serving as one example of a memory, and a display driver 90d connected to the CPU 90a via the same M/B chip set 90c. A network interface 90f, magnetic disk device 90g, audio driver 90h, and keyboard/mouse 90i are also connected to the M/B chip set 90c via a bridge circuit 90e.

In FIG. 2, the various configurational elements are connected via buses. For example, the CPU 90a and the M/B chip set 90c, and the M/B chip set 90c and the main memory 90b are connected via CPU buses, respectively. Also, the M/B chip set 90c and the display driver 90d can be connected via an accelerated graphics port (AGP). However, when the display driver 90d includes a PCI express-compatible video card, the M/B chip set 90c and the video card are connected via a PCI express (PCIe) bus. Also, when the network interface 90f is connected to the bridge circuit 90e, a PCI Express can be used for the connection, for example. For connecting the magnetic disk device 90g to the bridge circuit 90e, a serial AT attachment (ATA), a parallel-transmission ATA, or peripheral components interconnect (PCI) can be used. For connecting the keyboard/mouse 90i to the bridge circuit 90e, a universal serial bus (USB) can be used.

A creator of the 3D map can take videos of the scenery in the large-scale environment by using the digital video camera 20, for example, as he or she goes around. When taking videos in this way, the digital video camera 20 can receive beacon signals transmitted by the beacon transmitters 10. However, the receiving timing of the beacon signals is not limited to this. The receiving timing can be any timing as long as the digital video camera 20 receives the beacon signals at a place where the videos have been taken. Received Signal Strength Indicators (RSSIs) of the beacon signals (hereinafter referred to as "beacon RSSIs") can vary depending on the place where the digital video camera 20 takes a video. The digital video camera 20 can hold, in relation to a video taken at a place, a beacon signal file including a feature of the RSSIs of beacon signals at the place, as one example of a video-related data unit.

Figure 3:
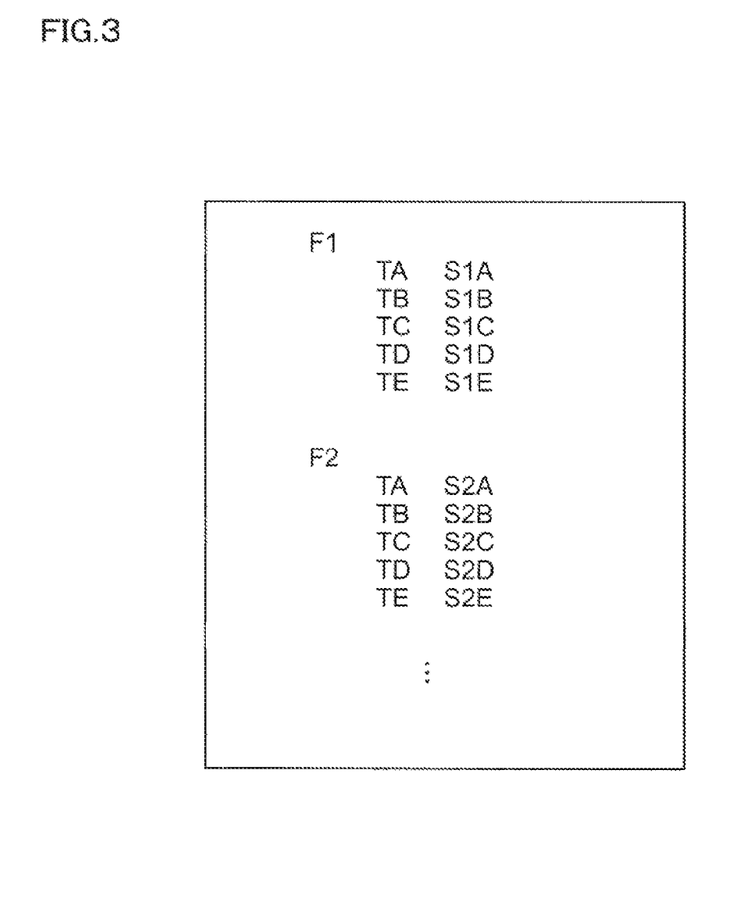
FIG. 3 depicts an example of the content of the beacon signal file in exemplary embodiments of the present invention.

Referring to FIG. 3, there is shown an example of the content of the beacon signal file. In this figure, it is assumed that the beacon signal file holds the RSSIs of the beacon signals for each video frame (hereinafter simply referred to as "frame") of the video. Also, it is assumed that beacon transmitters TA, TB, TC, TD and TE in this figure are installed as the beacon transmitters 10. This figure shows, for example, that the beacon signals received from the beacon transmitters TA, TB, TC, TD and TE at the place where a frame F1 is taken have the RSSIs S1A, S1B, S1C, S1D, and S1E, respectively. Further, this figure shows that the beacon signals received from the beacon transmitters TA, TB, TC, TD and TE at the place where a frame F2 is taken have the RSSIs S2A, S2B, S2C, S2D, and S2E, respectively.

Now, an overview of processing performed by the computer device 40 in a preferred embodiment will be provided.

Figure 4:
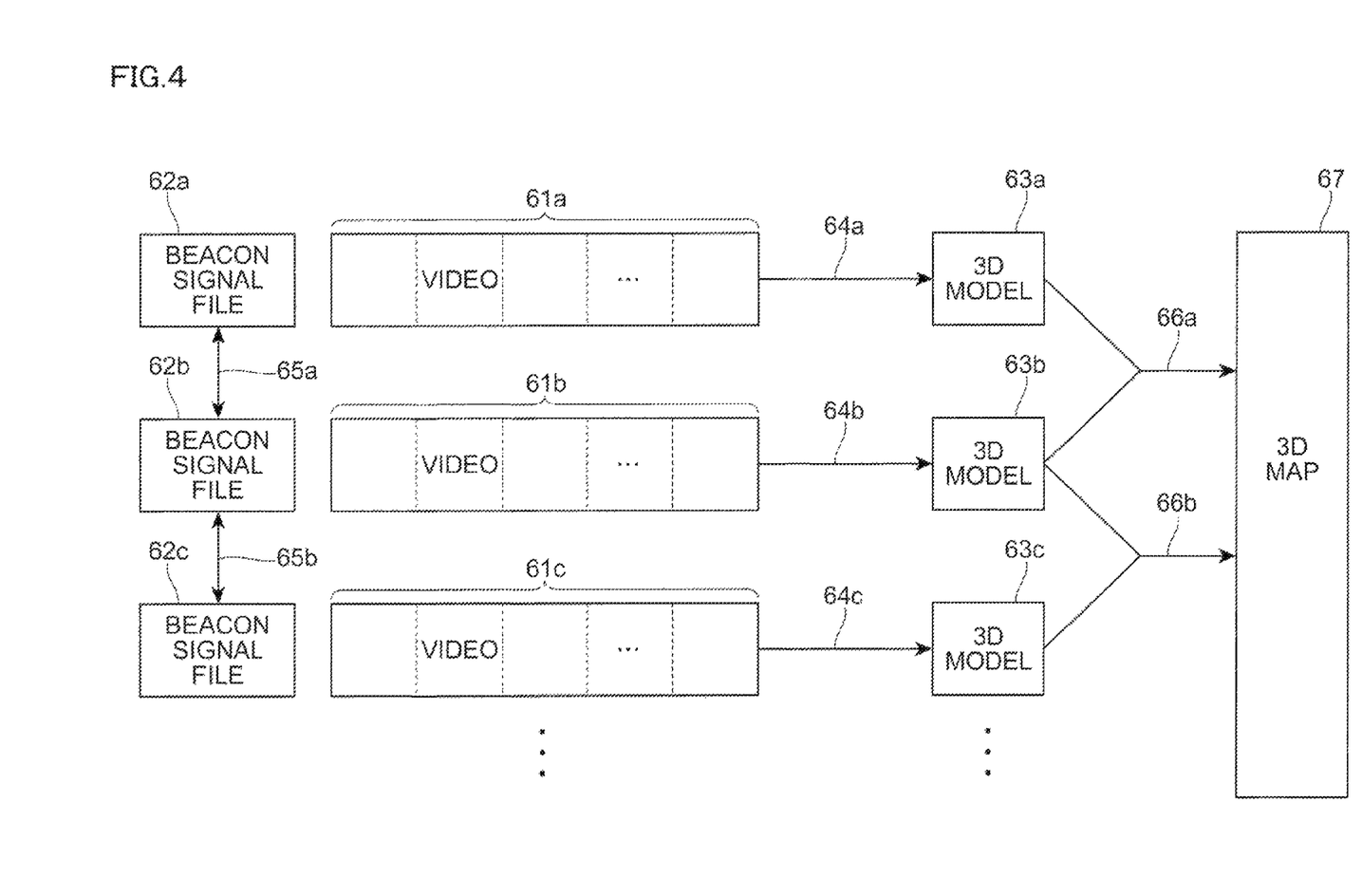
FIG. 4 depicts an example of the overview of processing of building the 3D map in exemplary embodiments of the present invention.

Referring to FIG. 4, there is shown an example of the overview of processing of building the 3D map.

First, plural videos and plural beacon signal files corresponding to the plural videos one by one can be obtained by the digital video camera 20. Specifically, when a video 61a is taken by the digital video camera 20 at one place, a beacon signal file 62a can also be obtained. Further, when a video 61b is taken by the digital video camera 20 at another place, a beacon signal file 62b can also be obtained. Furthermore, when a video 61c is taken by the digital video camera 20 at still another place, a beacon signal file 62c can also be obtained. The number of videos is not limited to three, and the videos more than three can be taken by the digital video camera 20. Similarly, beacon signal files more than three can be obtained.

Next, plural 3D models each based on corresponding one of the plural videos can be reconstructed separately by using known techniques such as Structure from Motion (SfM), a stereo camera or the like. Specifically, a 3D model 63a can be reconstructed based on the video 61a as indicated by an arrow 64a. Further, a 3D model 63b can be reconstructed based on the video 61b as indicated by an arrow 64b. Furthermore, a 3D model 63c can be reconstructed based on the video 61c as indicated by an arrow 64c. The same processing can be performed for other videos. Each of the plural 3D models can include correspondence among a 3D model coordinate, an image group, and beacon signal information pieces, for each of 3D model coordinates. The 3D model coordinate can be a coordinate of a position of a photographing object within a 3D model space. The image group can be a group of images which have been used to generate a corresponding 3D model coordinate, and each of the images can include image features which have been used to generate a corresponding 3D model coordinate. In this explanation, the "image" indicates an image which is originally a frame included in a video but stored in the computer device 40 as data to be processed. The beacon signal information pieces can be information pieces each indicating a feature of beacon signals received at a place where an image included in a corresponding image group has been taken.

Subsequently, candidate pairs of 3D models to merge can be selected from the plural 3D models. Specifically, the candidate pairs of 3D models can be selected from the 3D models 63a, 63b, 63c and so on. To select pairs of 3D models based on pairs of videos which have been taken at the same place, as the candidate pairs of 3D models, similarity between features of the beacon signals for each pair of videos can be used. The similarity between the features of the beacon signals for each pair of videos will be described later. In this figure, a feature of the beacon signal file 62a and a feature of the beacon signal file 62b are determined to be similar to each other, as indicated by a double-headed arrow 65a. This can cause a pair of the 3D model 63a and the 3D model 63b to be selected as a candidate pair of 3D models, as indicated by a Y-shaped arrow 66a. Further, a feature of the beacon signal file 62b and a feature of the beacon signal file 62c are determined to be similar to each other, as indicated by a double-headed arrow 65b. This can cause a pair of the 3D model 63b and the 3D model 63c to be selected as a candidate pair of 3D models, as indicated by a Y-shaped arrow 66b.

Then, the selected candidate pairs of 3D models can be merged by using known techniques. Specifically, the pair of the 3D model 63a and the 3D model 63b can be merged, and the pair of the 3D model 63b and the 3D model 63c can be merged. After that, a 3D map 67 can be generated based on the 3D models thus merged by using known techniques. Specifically, assuming that a first merged 3D model is obtained by merging the pair of the 3D model 63a and the 3D model 63b, and a second merged 3D model is obtained by merging the pair of the 3D model 63b and the 3D model 63c, the pair of the first merged 3D model and the second merged 3D model can be merged. The 3D map 67 can include correspondence among a real-world coordinate, the image group, and the beacon signal information pieces, for each of real-world coordinates in the large-scale environment. The real-world coordinate can be a coordinate of a position of the photographing object within a real-world space, and can be generated from the position of the photographing object within the 3D model space. The image group can be a group of images which have been used to generate a corresponding real-world coordinate, and each of the images can include image features which have been used to generate a corresponding real-world coordinate. The beacon signal information pieces as one example of an image-related data unit can be information pieces each indicating a feature of beacon signals received at a place where an image included in a corresponding image group has been taken.

On the other hand, in this figure, the feature of the beacon signal file 62a and the feature of the beacon signal file 62c are determined to be dissimilar to each other. This can cause a pair of the 3D model 63a and the 3D model 63c not to be selected as a candidate pair of 3D models.

Figure 5:
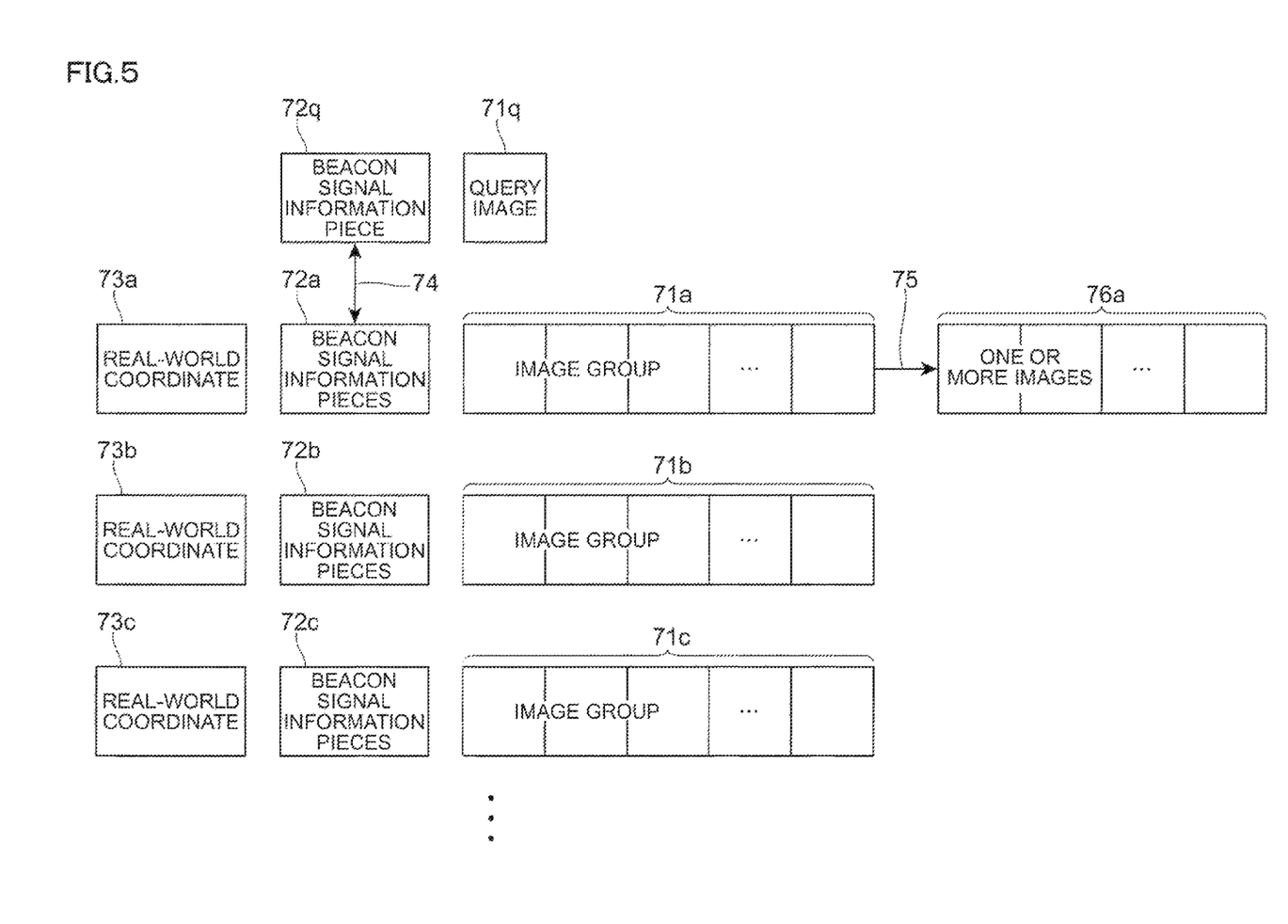
FIG. 5 depicts an example of the overview of processing of localizing a user in exemplary embodiments of the present invention.

Referring to FIG. 5, there is shown an example of the overview of processing of localizing a user.

In this figure, a correspondence among an image group 71a, beacon signal information pieces 72a, and a real-world coordinate 73a is stored in the computer device 40 as a part of the 3D map. Further, a correspondence among an image group 71b, beacon signal information pieces 72b, and a real-world coordinate 73b is stored in the computer device 40 as a part of the 3D map. Furthermore, a correspondence among an image group 71c, beacon signal information pieces 72c, and a real-world coordinate 73c is stored in the computer device 40 as a part of the 3D map. The number of correspondences each among an image group, beacon signal information pieces, and a real-world coordinate is not limited to three, and the correspondences more than three can be stored in the computer device 40.

First, a query image 71q and a beacon signal information piece 72q can be received from the mobile terminal 30. Specifically, when a query image 71q is taken by the mobile terminal 30 at one place, a beacon signal information piece 72q can also be obtained by the mobile terminal 30. Thus, the query image 71q and the beacon signal information piece 72q can be sent to the computer device 40, and received by the computer device 40.

Next, one or more images to be compared with the query image 71q can be selected from images included in the plural image groups. Specifically, the one or more images can be selected from images included in the image groups 71a, 71b, 71c, and so on. To select an image taken at the same place as the query image 71q, as one of the one or more images, similarity between features of the beacon signals for each pair of images can be used. The similarity between the features of the beacon signals for each pair of images will be described later. In this figure, the feature of each piece of the beacon signal information pieces 72a and the feature of the beacon signal information piece 72q are determined to be similar to each other, as indicated by a double-headed arrow 74. This can cause one or more images 76a to be selected as the one or more images to be compared with the query image 71q, as indicated by an arrow 75.

Subsequently, the query image 71q can be compared with each image included in the one or more images 76a. Thus, an image determined to be most similar to the query image 71q by using a commonly-used image matching algorithm can be selected from the one or more images 76a. Based on the selected image, the location and rotation angle of the mobile terminal 30 which has taken the query image 71q can be estimated. Note that the 3D map is assumed to include the information on the location and rotation angle of the mobile terminal 30 in relation to the selected image.

On the other hand, in this figure, the feature of any one piece of the beacon signal information pieces 72b and the feature of the beacon signal information piece 72q are determined to be dissimilar to each other, and the feature of any one piece of the beacon signal information pieces 72c and the feature of the beacon signal information piece 72q are determined to be dissimilar to each other. This can cause any image included in the image group 71b or the image group 71c not to be selected as the one or more images to be compared with the query image 71q, and cause the location and rotation angle of the mobile terminal 30 which has taken the query image 71q not to be estimated based on any image of images included in the image group 71b and images included in the image group 71c.

Now, similarity between features of beacon signals will be described. Explanation is given using iBeacon® signals as an example of the beacon signals.

First, it is assumed that $\hat{b}_i$ represents a raw beacon RSSI of a raw beacon signal received from the i-th beacon transmitter 10 (i=1, 2, . . . , n). The raw beacon RSSI $\hat{b}_i$ can be normalized to obtain a beacon RSSI $b_i$ by the following formula.

$$b_i = 100 \left( \frac{100 + \hat{b}_i}{100 + \underset{j:\hat{b}_j \neq -100}{Med} \{\hat{b}_j\}} \right), j = \{1, 2, \ldots, n\}$$

In this formula, "Med" is a function to find a median of a set following "Med".

Normalizing the raw beacon RSSI $\hat{b}_i$ can enable the beacon RSSI $b_i$ to handle RSSI fluctuations. Further, normalizing the raw beacon RSSI $\hat{b}_i$ can enable the beacon RSSI $b_i$ to take a value from 0 to 100, while the raw beacon RSSI $\hat{b}_i$ obtained from an iBeacon® device takes a value from −100 to 0.

Next, it is assumed that $b^x$ represents a vector whose components are beacon RSSIs $b^x_1, b^x_2, \ldots, b^x_n$ observed at a place x, and that $b^y$ represents a vector whose components are beacon RSSIs $b^y_1, b^y_2, \ldots, b^y_n$ observed at a place y.

Similarity between $b^x$ and $b^y$ can be evaluated by using two measures.

The first measure can be beacon signal co-occurrence (hereinafter simply referred to as "co-occurrence") as one example of co-occurrence information. The co-occurrence for $b^x$ and $b^y$ can be an indicator representing a degree of similarity between a set of the beacon transmitters 10 transmitting observed beacon signals among the beacon signals indicated by $b^x$ and a set of the beacon transmitters 10 transmitting observed beacon signals among the beacon signals indicated by $b^y$. The co-occurrence for $b^x$ and $b^y$ can be calculated by the following formula.

$$c(b^x, b^y) = \frac{\sum_{i=1}^{n} \min(b^x_i, b^y_i)}{\sum_{i=1}^{n} \max(b^x_i, b^y_i)}$$

In this formula, "$\min(b^x_i, b^y_i)$" is a function to find the smaller of $b^x_i$ and $b^y_i$, and "$\max(b^x_i, b^y_i)$" is a function to find the larger of $b^x_i$ and $b^y_i$.

The second measure can be beacon signal dissimilarity (hereinafter simply referred to as "dissimilarity") as one example of dissimilarity information. The dissimilarity of $b^x$ and $b^y$ can be an indicator representing a degree of dissimilarity between each of beacon RSSIs in $b^x$ and each of beacon RSSIs in $b^y$. The dissimilarity of $b^x$ and $b^y$ can be calculated by the following formula.

$$d(b^x, b^y) = \frac{\sum_{i: b^x_i > 0, b^y_i > 0} |b^x_i - b^y_i|}{\sum_{i: b^x_i > 0, b^y_i > 0} 1}$$

The similarity between the features of the beacon signals can be calculated, for example, by using a function to output a larger value as $c(b^x, b^y)$ becomes larger or as $d(b^x, b^y)$ becomes smaller.

This similarity can correspond to "the similarity between the features of the beacon signals for each pair of images" used in the processing of localizing a user of FIG. 5, if $b^x$ and $b^y$ are prepared for each image.

However, this similarity can not correspond to "the similarity between the features of the beacon signals for each pair of videos" used in the processing of building a 3D map of FIG. 4, unless $c(b^x, b^y)$ for each pair of videos and $d(b^x, b^y)$ for each pair of videos are calculated. Specifically, $c(b^x, b^y)$ for each pair of videos can be calculated by redefining "$\min(b^x_i, b^y_i)$" as a function to find the smallest of $b^x_i$ and $b^y_i$ over all frames, and by redefining "$\max(b^x_i, b^y_i)$" as a function to find the largest of $b^x_i$ and $b^y_i$ over all frames. Further, $d(b^x, b^y)$ for each pair of videos can be calculated by calculating $d(b^x, b^y)$ for all pairs of frames by using the above-mentioned formula, and by summing the calculated $d(b^x, b^y)$ for all pairs of frames.

Figure 6:
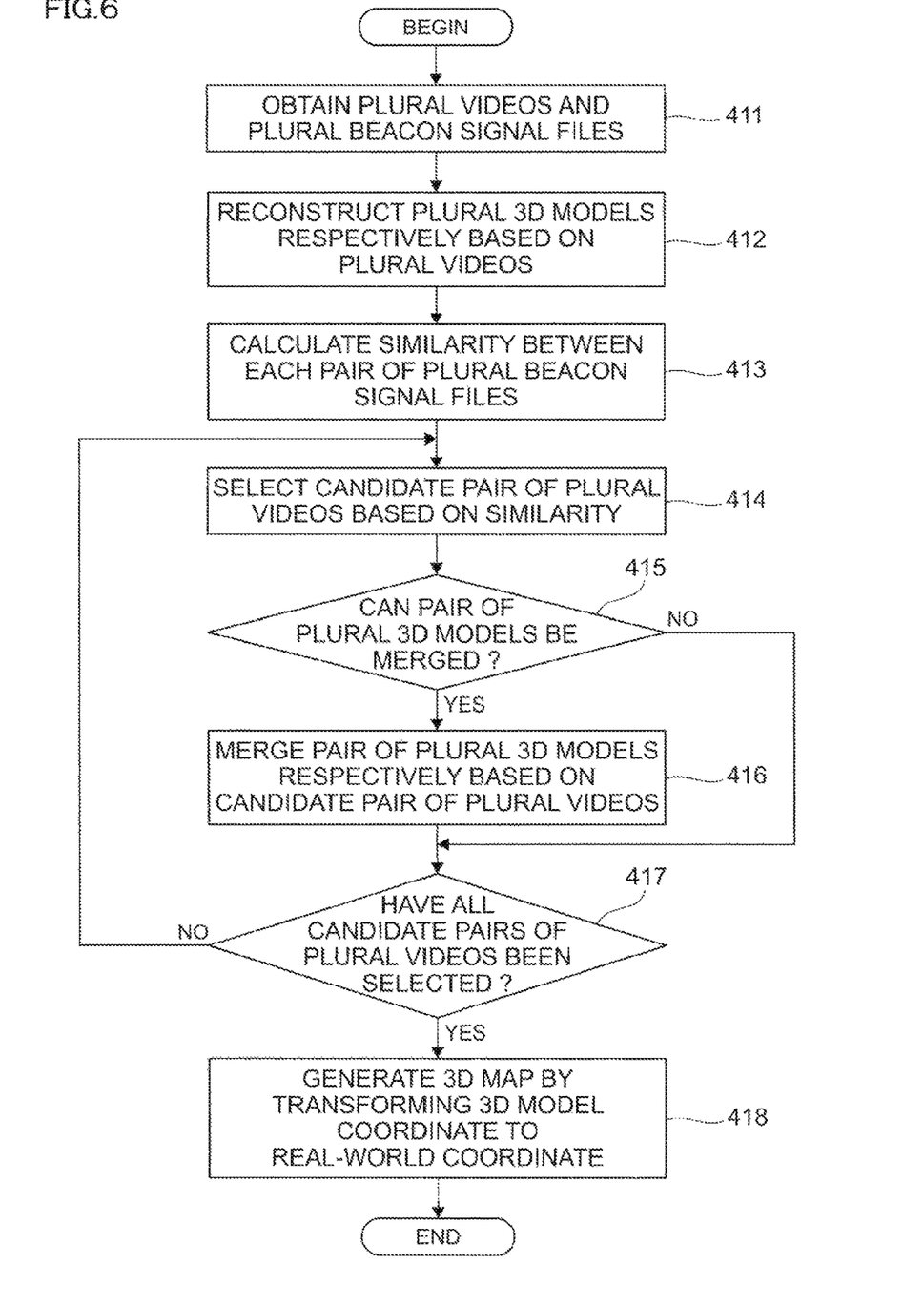
FIG. 6 depicts a flowchart representing an example of an operation performed when a 3D map building module builds a 3D map.

Referring to FIG. 6, there is shown a flowchart representing an example of an operation performed when the 3D map building module 41 builds a 3D map.

As shown in the figure, the 3D map building module 41 can first obtain plural videos and plural beacon signal files corresponding to the plural videos one by one (step 411). The 3D map building module 41 can reconstruct plural 3D models respectively based on the plural videos obtained at step 411 (step 412). The 3D map building module 41 can calculate similarity between each pair of the plural beacon signal files obtained at step 411 (step 413).

Next, the 3D map building module 41 can select a candidate pair of the plural videos based on the similarity calculated at step 413 (step 414). The candidate pair can have similarity exceeding a predetermined threshold. The similarity can be between a pair of the plural beacon signal files corresponding to the candidate pair of the plural videos. Thus, a pair of the plural 3D models corresponding to the candidate pair of the plural videos is specified.

Subsequently, the 3D map building module 41 can determine whether or not the pair of the plural 3D models can be merged (step 415). This determination is made because there are cases where the pair of the plural 3D models cannot be merged even though a corresponding pair of the plural videos is selected as the candidate pair. Such cases can include when the pair of the plural 3D models corresponds to images in different directions taken at the same place. If the pair of the plural 3D models can be merged, the 3D map building module 41 can merge the pair of the plural 3D models (step 416), and advance the processing to step 417. If, at step 415, the pair of the plural 3D models cannot be merged, the 3D map building module 41 can advance the processing to step 417 without merging the pair of the plural 3D models.

After that, the 3D map building module 41 can determine whether or not all candidate pairs of the plural videos have been selected at step 414 (step 417). If all candidate pairs of the plural videos have not yet been selected, the 3D map building module 41 can return the processing to step 414. If, at step 417, all candidate pairs of the plural videos have been selected, the 3D map building module 41 can generate a 3D map by transforming 3D model coordinate to real-world coordinate (step 418).

Figure 7:
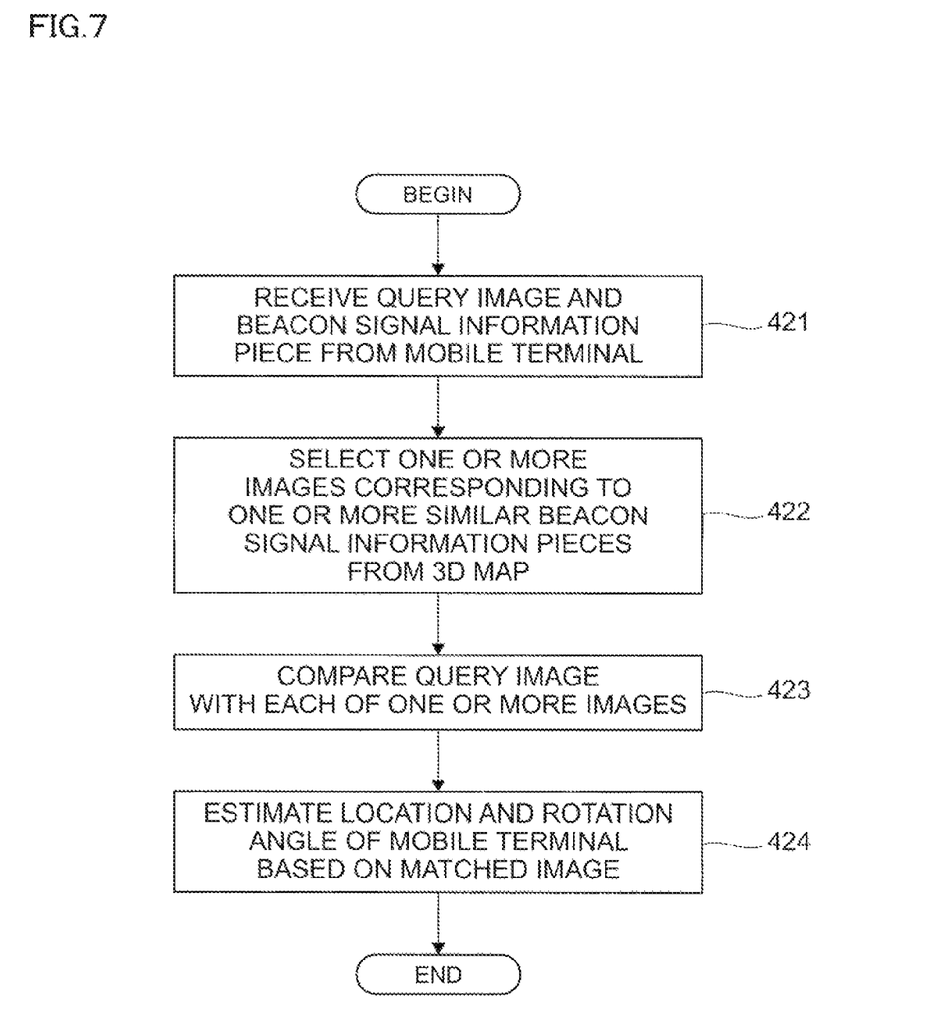
FIG. 7 depicts a flowchart representing an example of an operation performed when a user localization module localizes a user.

Referring to FIG. 7, there is shown a flowchart representing an example of an operation performed when the user localization module 42 localizes a user.

As shown in the figure, the user localization module 42 can first receive a query image and a beacon signal information piece from the mobile terminal 30 (step 421). Next, the user localization module 42 can select one or more images corresponding to one or more similar beacon signal information pieces included in the beacon signal information pieces, from the 3D map generated at step 418 of FIG. 6 (step 422). The one or more similar beacon signal information pieces can be similar to the beacon signal information piece received at step 421. Subsequently, the user localization module 42 can compare the query image received at step 421 with each of the one or more images selected at step 422 (step 423). Finally, the user localization module 42 can estimate the location and rotation angle of the mobile terminal 30 based on the image matched with the query image at step 423 (step 424).

In the foregoing description, the 3D map building module 41 is assumed to merge a candidate pair of 3D models every time it is selected. However, as an alternative embodiment, the 3D map building module 41 can accumulate a candidate pair of 3D models when it is selected. After all candidate pairs of 3D models have been selected, the 3D map building module 41 can merge all the candidate pairs of 3D models. That is, in this alternative embodiment, the 3D map building module 41 can select a first pair of 3D models but refrain from merging the first pair of 3D models when the first pair of 3D models is selected. Subsequently, the 3D map building module 41 can select a second pair of 3D models from the plural 3D models, and can merge the first pair of 3D models and the second pair of 3D models when the second pair of 3D models is selected.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for building a 3D map, the method comprising:
   obtaining a plurality of videos and a plurality of video-related data units, each of the plurality of video-related data units indicating a feature of radio wave signals received at a place where a corresponding video has been taken;
   reconstructing a plurality of 3D models, respectively, based on the plurality of videos;
   selecting a pair of 3D models from the plurality of 3D models based on similarity between a corresponding pair of video-related data units; and
   merging the pair of 3D models to obtain the 3D map.

2. The computer-implemented method according to claim 1, further comprising:
   calculating the similarity between a first video-related data unit and a second video-related data unit of the pair, by using co-occurrence information representing a degree of similarity between a set of observed radio wave signals indicated by the first video-related data unit and a set of observed radio wave signals indicated by the second video-related data unit.

3. The computer-implemented method according to claim 1, further comprising:
   calculating the similarity between a first video-related data unit and a second video-related data unit of the pair, by using dissimilarity information representing a degree of dissimilarity between strengths of radio wave signals indicated by the first video-related data unit and strengths of radio wave signals indicated by the second video-related data unit.

4. The computer-implemented method according to claim 1, wherein the selecting the pair of 3D models includes selecting a first pair of 3D models and subsequently a second pair of 3D models from the plurality of 3D models, and the merging the pair of 3D models includes merging the first pair of 3D models and the second pair of 3D models respectively in response to a selection of the second pair of 3D models.

5. The computer-implemented method of claim 1, further comprising:
   storing the 3D map including a plurality of images and a plurality of image-related data units, each of the plurality of image-related data units indicating a feature of radio wave signals received at a place where a corresponding image has been taken;
   obtaining an input image and an input data unit, the input data unit indicating a feature of radio wave signals received at a specific place where the input image has been taken;
   selecting at least one image from the plurality of images included in the 3D map, based on similarity between the input data unit and at least one image-related data unit of the plurality of image-related data units included in the 3D map;
   comparing the input image with the at least one image; and
   estimating the specific place, based on a result of the comparing.

6. An apparatus for building a 3D map, the apparatus comprising:
   a processor; and
   a memory coupled to the processor, wherein the memory comprises program instructions executable by the processor to cause the processor to:
   obtain a plurality of videos and a plurality of video-related data units, each of the plurality of video-related data units indicating a feature of radio wave signals received at a place where a corresponding video has been taken;
   reconstruct a plurality of 3D models, respectively, based on the plurality of videos;
   select a pair of 3D models from the plurality of 3D models based on similarity between a corresponding pair of video-related data units; and
   merge the pair of 3D models to obtain the 3D map.

7. A computer program product for building a 3D map, the computer program product comprising a non-transitory computer readable storage medium having program instructions embodied therewith, the program instructions executable by a computer to cause the computer to:
   obtain a plurality of videos and a plurality of video-related data units, each of the plurality of video-related data units indicating a feature of radio wave signals received at a place where a corresponding video has been taken;
   reconstruct a plurality of 3D models, respectively, based on the plurality of videos; select a pair of 3D models from the plurality of 3D models based on similarity between a corresponding pair of video-related data units; and
   merge the pair of 3D models to obtain the 3D map.

8. The apparatus of claim 6, wherein the program instructions executable by the processor further cause the processor to:
   calculate the similarity between a first video-related data unit and a second video-related data unit of the pair, by using co-occurrence information representing a degree of similarity between a set of observed radio wave signals indicated by the first video-related data unit and a set of observed radio wave signals indicated by the second video-related data unit.

9. The apparatus of claim 6, wherein the program instructions executable by the processor further cause processor to:
   calculate the similarity between a first video-related data unit and a second video-related data unit of the pair, by using dissimilarity information representing a degree of dissimilarity between strengths of radio wave signals indicated by the first video-related data unit and strengths of radio wave signals indicated by the second video-related data unit.

10. The apparatus of claim 6, wherein the selecting the pair of 3D models includes selecting a first pair of 3D models and subsequently a second pair of 3D models from the plurality of 3D models, and the merging the pair of 3D models includes merging the first pair of 3Dmodels and the second pair of 3D models respectively in response to a selection of the second pair of 3D models.

11. The apparatus of claim 6, wherein the program instructions executable by the processor further cause the processor to:

store the 3D map including a plurality of images and a plurality of image-related data units, each of the plurality of image-related data units indicating a feature of radio wave signals received at a place where a corresponding image has been taken;

obtain an input image and an input data unit, the input data unit indicating a feature of radio wave signals received at a specific place where the input image has been taken;

select at least one image from the plurality of images included in the 3D map, based on similarity between the input data unit and at least one image-related data unit of the plurality of image-related data units included in the 3D map;

compare the input image with the at least one image; and estimating the specific place, based on a result of the comparing.

12. The computer program product of claim 7, wherein the program instructions executable by the computer further cause the computer to:

calculate the similarity between a first video-related data unit and a second video-related data unit of the pair, by using co-occurrence information representing a degree of similarity between a set of observed radio wave signals indicated by the first video-related data unit and a set of observed radio wave signals indicated by the second video-related data unit.

13. The computer program product of claim 7, wherein the program instructions executable by the computer further cause the computer to:

calculate the similarity between a first video-related data unit and a second video-related data unit of the pair, by using dissimilarity information representing a degree of dissimilarity between strengths of radio wave signals indicated by the first video-related data unit and strengths of radio wave signals indicated by the second video-related data unit.

14. The computer program product of claim 7, wherein the selecting the pair of 3D models includes selecting a first pair of 3D models and subsequently a second pair of 3D models from the plurality of 3D models, and the merging the pair of 3D models includes merging the first pair of 3D models and the second pair of 3D models respectively in response to a selection of the second pair of 3D models.

15. The computer program product of claim 7, wherein the program instructions executable by the computer further cause the computer to:

store the 3D map including a plurality of images and a plurality of image-related data units, each of the plurality of image-related data units indicating a feature of radio wave signals received at a place where a corresponding image has been taken;

obtain an input image and an input data unit, the input data unit indicating a feature of radio wave signals received at a specific place where the input image has been taken;

select at least one image from the plurality of images included in the 3D map, based on similarity between the input data unit and at least one image-related data unit of the plurality of image-related data units included in the 3D map;

compare the input image with the at least one image; and estimating the specific place, based on a result of the comparing.

* * * * *